Dec. 26, 1944.　　　J. A. FORBES　　　2,366,094
BRAKE
Filed Sept. 28, 1942　　　2 Sheets-Sheet 1

INVENTOR.
JOSEPH A. FORBES
BY
ATTORNEYS

Dec. 26, 1944.   J. A. FORBES   2,366,094
BRAKE
Filed Sept. 28, 1942   2 Sheets-Sheet 2

INVENTOR.
JOSEPH A. FORBES
BY
ATTORNEYS

Patented Dec. 26, 1944

2,366,094

UNITED STATES PATENT OFFICE 2,366,094

BRAKE

Joseph A. Forbes, Detroit, Mich., assignor to John Sneed, Royal Oak, Mich.

Application September 28, 1942, Serial No. 459,977

2 Claims. (Cl. 188—72)

The invention relates to brakes and refers more particularly to brakes of that type having relatively rotatable sets of brake members axially movable relative to each other from off position to apply the brake.

The invention has for one of its objects to provide in a brake in which one of the sets comprises brake members at opposite sides of another brake member improved means for yieldably holding the brake members in predetermined relation to each other when in off position.

The invention has for another of its objects to provide the brake with improved means for yieldably holding in off position the intermediate brake member.

With these as well as other objects in view, the invention resides in the novel features of construction and combinations and arrangements of parts as more fully hereinafter set forth.

In the drawings:

Figure 4 is an edge elevation of a portion of the brake;

Figure 1:
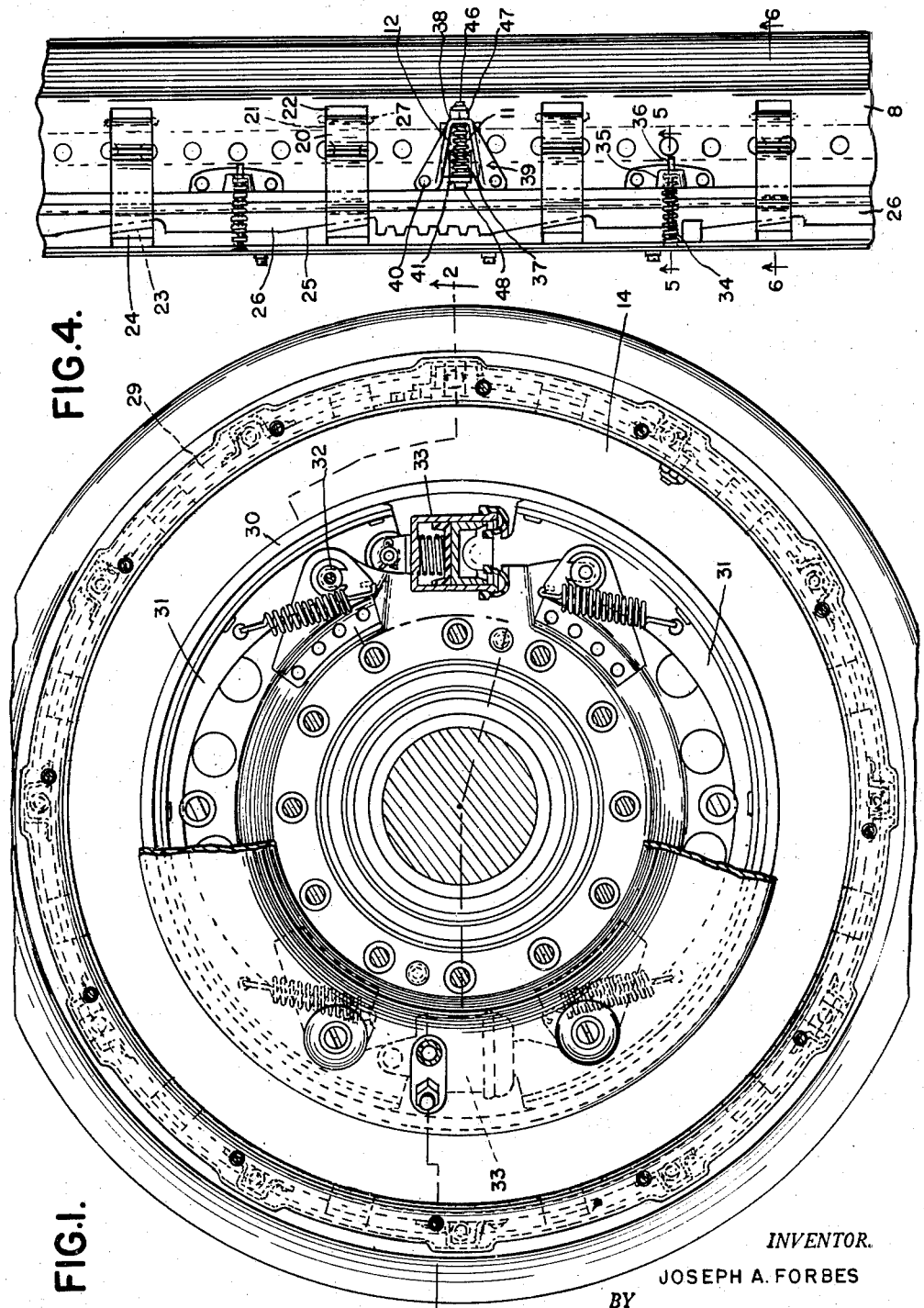
Figure 1 is an inboard elevation, partly broken away, of a brake embodying the invention.
Figure 2:
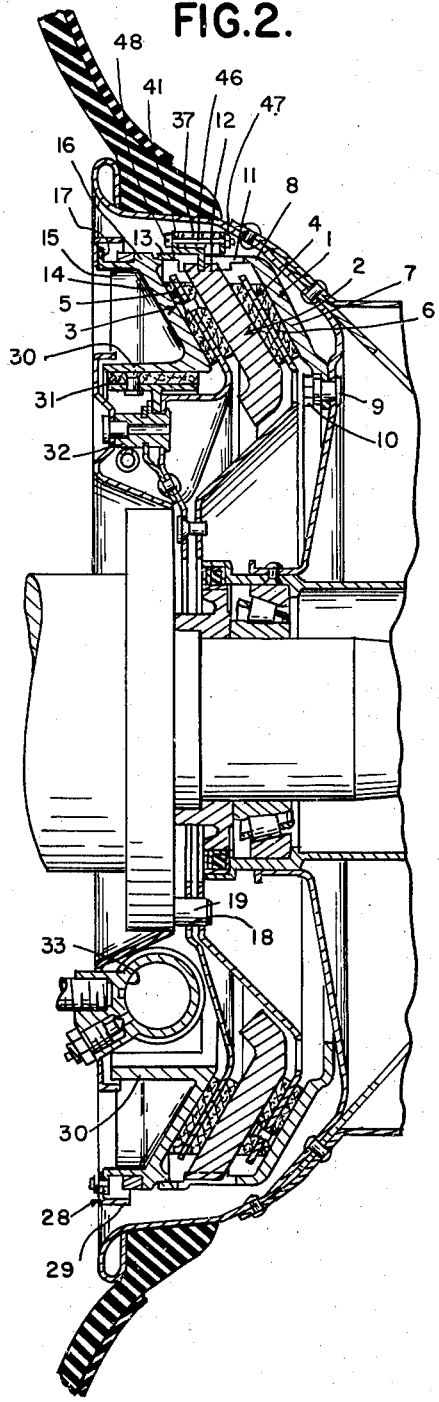
Figure 2 is a cross section on the line 2—2 of Figure 1.
Figure 3:
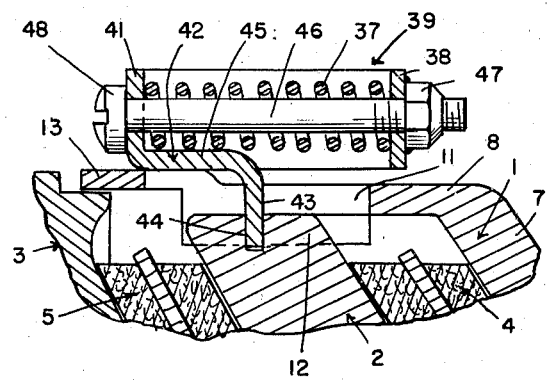
Figure 3 is an enlarged view of a portion of 1.
Figure 5:
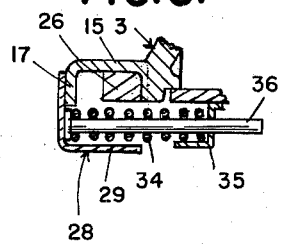
Figure 6:
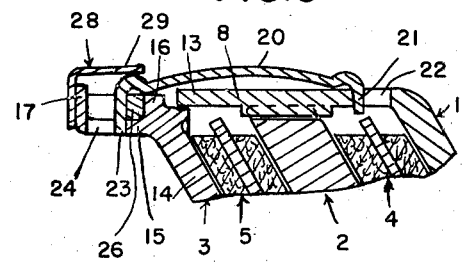

Figures 5 and 6 are cross sections on the lines 5—5 and 6—6, respectively, of Figure 4.

The brake, as illustrated in the drawings, is of that type having a main brake mechanism and a pilot brake mechanism for applying the main brake mechanism. In the present instance, the brake is shown as applied to an airplane landing wheel.

The main brake mechanism comprises the set of rotatable outboard, intermediate and inboard brake members 1, 2 and 3, respectively, and the set of non-rotatable outboard and inboard brake members 4 and 5, respectively. The rotatable brake members have frusto-conical friction faces for engaging the friction linings 6 secured to opposite sides of corresponding frusto-conical portions of the non-rotatable brake members. The rotatable outboard friction member 1 is drum-shaped and has the disc 7 and the annular wall 8 extending in an inboard direction from the periphery of the disc. The disc is provided with a frusto-conical friction face for engaging the adjacent friction lining and with a substantially radial portion which is suitably secured to the landing wheel as by means of the bolts 9 and the nuts 10. The annular wall 8 is formed with the axially extending openings 11 into which extend radial projections 12 at the outer edge of the rotatable intermediate brake member 2. The radial projections serve to guide the rotatable intermediate brake member in the rotatable outboard brake member. The annular wall 8 is also formed with the enlargement 13 axially inwardly of the openings 11 and encircling and piloting the rotatable inboard brake member 3. The rotatable intermediate brake member 2 is in the nature of a disc provided at its opposite sides with frusto-conical friction faces for engaging the adjacent friction linings. The rotatable inboard brake member 3 has the disc portion 14 provided with a frusto-conical friction base at its outboard side for engaging the adjacent friction lining. The rotatable inboard brake member also has at its outer periphery the axially extending flange 15 which is provided with the radially outwardly extending outboard and inboard flanges 16 and 17, respectively. The non-rotatable outboard and inboard brake members 4 and 5 are in the nature of discs having substantially radial central portions each formed with an annular series of holes 18 for slidably engaging the studs 19 extending in an outboard direction from the flanged member on which the wheel is journaled.

20 are channel-shaped links preferably formed of spring steel operatively connecting the rotatable outboard and inboard brake members 1 and 2, respectively, and normally rotating the latter with the former. The links extend substantially axially in the normal or off position of the parts and are angularly spaced at equal distances from each other about the annular wall 8 of the outboard brake member and the axially extending flange 15 of the inboard brake member. Each link is provided at its outboard end with the radially inwardly extending portion 21 which extends through an opening 22 in the annular wall 8 and abuts the inboard end of the opening. Each link is provided at its inboard end with the radially inwardly extending portion 23 which extends through an opening 24 in the axially extending flange 15. The radially inwardly extending portion 23 is engageable with one of the cams 25 of the cam ring 26 which is located at the inboard side of the outboard flange 16 and is provided with rack teeth for engagement by a suitable tool to effect rotatable adjustment of the cam ring. To prevent the links from becoming accidentally disengaged, their outboard portions 21 are provided with the lateral projections 27 which extend circumferentially inside the annular wall 8 beyond the openings 22. Also a sheet metal guard 28 is provided detachably secured to the inboard flange 17 and having the axial flange 29 which is radially outwardly spaced from the inboard brake member and which also encircles the inboard end portions of the links.

The pilot brake mechanism for retarding the rotatable inboard brake member 3 of the main brake mechanism to thereby apply the main brake mechanism through the links 20 comprises the rotatable brake drum 30 and the brake shoes 31 engageable with the cylindrical inner friction face of the drum. The drum extends in an inboard direction from the inner end of the rotatable inboard brake member 3 and is preferably integral therewith. The shoes have friction linings secured to their radially outer faces and the shoes are carried by the non-rotatable inboard brake member 5. The shoes are adapted to be anchored by the anchor pins 32 which are secured to the non-rotatable inboard brake member 5 and the shoes are adapted to be actuated by the diametrically opposite fluid pressure operated actuators or wheel cylinders 33 which are positioned between and are carried by the end portions of the shoes. For a more detailed description of the pilot brake mechanism, reference may be had to the John Sneed patent application Serial No. 418,790, filed November 12, 1941.

For the purpose of yieldably holding the rotatable brake members in their normal or off positions to thereby provide clearance for the non-rotatable brake members and also to prevent rattle, the rotatable outboard and inboard brake members are resiliently urged apart by the compression coil springs 34 which are located circumferentially between the links 20 and have their opposite ends operatively connected to the rotatable outboard and inboard brake members. Each coil spring extends axially and its outboard end is housed within and abuts the channel-shaped bracket 35 which is secured to the radially outer face of the annular wall 8 near its inboard end. The inboard end of each coil spring is housed within the guard 28 and abuts the radial flange of this guard. A rod 36 extending through the bracket 35 guides each coil spring which abuts the bracket and a head on the inboard end of the rod and holds the head against the radial flange of the guard. The rotatable intermediate brake member 2 is yieldably held in its normal or off position and in predetermined relation to the rotatable outboard and inboard brake members by the compression coil springs 37 which are located between certain of the coil springs 34 and extend axially outside the annular flange 8 of the outboard brake member. Each coil spring at its outboard end abuts the web 38 of the generally U-shaped bracket 39 which is secured by suitable means, such as the rivets 40, to the radially outer face of the annular flange 8 near its inboard end. The inboard end of each coil spring abuts the radially outwardly extending flange 41 of the bracket 42 having the radially inwardly extending flange 43 extending through an opening 11 in the annular flange 8 and into the transverse groove 44 in a radial projection 12 of the rotatable intermediate brake member 2. The axially extending portion 45 of each bracket slidably engages the radially outer face of the portion of the annular wall beyond the inboard end of the opening 11. For limiting the movement of the rotatable intermediate brake member 2 axially away from the rotatable outboard brake member 1 under the influence of the coil springs 37, I have provided an adjustable tie between each of the associated brackets 39 and 42. The tie comprises the bolt 46 extending through the radially outwardly extending flange 41 and the web 38 and encircled by a coil spring 37 and the nut 47 threadedly engaging the outboard end of the bolt and non-rotatably secured to the bracket 39 as by being welded to its web 38. The bolt has the slotted head 48 abutting the inboard side of the radially outwardly extending flange 41. The construction is such that the bolt may be readily rotated by means of a screw driver or the like to accurately locate the rotatable intermediate brake member 2 in a predetermined relation to the rotatable outboard brake member 1 when the parts are in their normal or off positions.

In operation and assuming the wheel to be rotating and the parts of the brake mechanisms to be in their off positions, it will be seen that the rotatable inboard brake member 3 is being rotated by the rotatable outboard brake member 1 through the links 20 which are held in axial position by the coil springs 34. When the brake shoes 31 are applied to the brake drum 30, the rotatable inboard brake member 3 is retarded and as a result the links 20 compel the rotatable inboard brake member 3 to move axially outwardly toward the rotatable outboard brake member 1. As a result, the non-rotatable inboard brake member 5 is moved into engagement with the rotatable intermediate brake member 2, and the latter, in turn, is moved into engagement with the non-rotatable outboard brake member 4 which is finally moved against the rotatable outboard brake member 1, the movement of the parts taking place against the resistance offered by the coil springs 34 and 37. When the braking pressure is released the coil springs 34 serve to move the rotatable inboard brake member 3 away from the rotatable outboard brake member 1 to a predetermined position, as determined by the links 20 and the cam ring 26. Also the coil springs 37 serve to resiliently move the rotatable intermediate brake member 2 away from the rotatable outboard brake member 1 to a predetermined position as determined by the bolts 46 and the nuts 47. It will be noted that the off positions of the parts may be readily varied to provide for wear and to secure a predetermined clearance between the relatively rotatable parts.

What I claim as my invention is:

1. In a brake, the combination with a set of brake members movable axially relative to each other and comprising a brake member having an annular flange provided with openings, a second brake member extending within said annular flange and having guiding portions extending within said openings, and means for resiliently holding said brake members in predetermined axial relation, said holding means comprising a bracket extending through one of said openings and engaging a guiding portion on said second brake member, a second bracket secured to said annular flange, a spring between said brackets, and adjustable tie means connected to said brackets.

2. In a brake, the combination with a set of brake members movable axially relative to each other and comprising a brake member having an annular flange provided with openings, a second brake member extending within said annular flange and having guiding portions extending within said openings, and means for resiliently holding said brake members in predetermined axial relation, said holding means comprising a bracket extending through one of said openings and engaging said second brake member, a second bracket secured to said annular flange, and a spring between said brackets.

JOSEPH A. FORBES.